US006817857B2

(12) United States Patent
Spangenberg et al.

(10) Patent No.: US 6,817,857 B2
(45) Date of Patent: Nov. 16, 2004

(54) MAIN FRAME FOR A CONCRETE BLOCK MOLDING APPARATUS

(75) Inventors: Erik Spangenberg, Brædstrup (DK); Jesper B. Rasmussen, Brabrand (DK)

(73) Assignee: KVM Industrimaskiner A/S, Kjellerup (DK)

( * ) Notice: Subject to any disclaimer, the term of this patent is extended or adjusted under 35 U.S.C. 154(b) by 187 days.

(21) Appl. No.: 10/024,533

(22) Filed: Dec. 21, 2001

(65) Prior Publication Data

US 2002/0098258 A1 Jul. 25, 2002

(30) Foreign Application Priority Data

Dec. 22, 2000 (DK) ........................................ 2000 01930

(51) Int. Cl.[7] .................................................. F16M 1/08

(52) U.S. Cl. ....................... 425/254; 425/452; 249/192; 249/211; 249/216

(58) Field of Search ................................. 425/254, 260, 425/452; 249/192, 194, 208, 211, 216, 13

(56) References Cited

U.S. PATENT DOCUMENTS 4,063,859 A 12/1977 Halle et al. ................. 425/139
6,378,837 B1 * 4/2002 Keller ........................ 249/211

FOREIGN PATENT DOCUMENTS

| | | |
|---|---|---|
| DE | 1 816 619 | 6/1970 |
| DE | 2 124 547 | 12/1971 |
| EP | 0 382 653 | 8/1990 |
| EP | 0 412 533 | 2/1991 |
| JP | 2000/009292 | 1/2000 |
| SU | 1 400 890 | 6/1988 |
| WO | WO97/47914 | 12/1997 |

* cited by examiner

*Primary Examiner*—Robert Davis
*Assistant Examiner*—Thu Khanh T. Nguyen
(74) *Attorney, Agent, or Firm*—Nixon Peabody LLP; David S. Safran

(57) ABSTRACT

A main frames having bottom and top frame parts for concrete molding machines of the kind which are used in making slabs or blocks for covering surfaces and erecting walls are usually made by welding together cut standard steel sections of the types HEM, RHS, UNP, etc. The requirements to materials and welds at the making of bottom frames of this kind are high due to the fact that welded structures subjected to vibration only has 10–15% of the basic material strength in the welding zones. Thus, the main frame has a bottom frame part (40) formed of two flame cut bottom plates (42, 44) arranged in parallel as an upper plate (42) and a lower plate (44) and forming the basic shape of the bottom, the bottom plates (42, 44) being interconnected by at least two longitudinal plates (46, 48) and a number of transverse plates (50, 52, 54). In this way, substantial savings are achieved as the main frame can be made with fewer or no welds in the critical areas, or with welds of a lower class.

9 Claims, 4 Drawing Sheets

MAIN FRAME FOR A CONCRETE BLOCK MOLDING APPARATUS

BACKGROUND OF THE INVENTION

1. Field of the Invention

The present invention concerns a main frame for a concrete molding apparatus of the kind used for making blocks or slabs for walls and surfaces.

2. Description of Related Art

The main components of a molding apparatus of the initially indicated type are a main frame 2 (FIG. 3) which forms a support for a vibration arrangement on which a concrete product slab is carried, and for conveying means for transporting product slabs through the concrete molding machine. Furthermore, the main frame 2 forms a support for a retainer arrangement for an upper mold part, a concrete hopper and for a filling arrangement associated with the molding apparatus. The main frame also provides a base for column guides for parallel guiding of the mold and the retainer arrangement.

The vibration arrangement comprises a vibration table and a grate arrangement and acts on the overlying product slab for compressing the concrete filled into the mold.

The mold 18 is constituted by a cellular lower part, the cells of which are open upward and downward. The cell partitions form the boundaries of and define the desired basic shape of each single slab, and a corresponding upper part has pressing pistons projecting downward from an upper holder plate mounted on the retainer, the downward facing sides of the piston having shaped press plates fitting into respective underlying cells in the lower part and which are useful thereby for applying a downward directed retaining force and for ejecting molded items from the cells.

During the compression stage, when the vibration system vibrates the product slab and the mold, with the concrete against respective press plates acting as retainers for the concrete in respective cells, a very great vibrating force is exerted on the entire main frame 2, partly as reactive forces from the vibrating system and partly as holding forces of the retainer system through the top frame 30 and the sides 32 down to the bottom.

The bottom frame is normally built up by welding together of adapted standard sections of the types HEM, RHS, UNP, etc. as shown in FIG. 3. In order to ensure good welding, the standard sections have to be sharpened or bevelled with a suitable angle for permitting full welding of the joint between the transverse 34 and the longitudinal 36 sections. By this method, the forces from compressing typically occur right at and around the weld zones 38. The requirements for materials and welds for making of bottom frames of the kind indicated are, as hinted above, high, due to the fact that welded structures subjected to vibrations are only considered to have 10–15% of the strength of the basic materials in the welding zones. Considerable resources may thus be saved by making a main frame for a slab molding apparatus if it could be made by using fewer or no welds in the critical areas, or by using welds of a lower class.

SUMMARY OF THE INVENTION

By the invention, it has been realised that it will be possible to make a main fame of the kind indicated which allows use of considerably lower class welds by making the bottom of the main frame of two flame cut bottom plates arranged in parallel as an upper plate and a lower plate and forming the basic shape of the bottom, the bottom plates being interconnected by at least two longitudinal plates and a number of transverse plates.

Hereby is achieved that no welds are loaded laterally with vibrating or oscillating forces while, at the same time, the welds between flame cut plates, on the one hand, and the longitudinal and transverse plates, on the other hand, may be made to a considerably lower weld class without reducing the strength and quality of the main frame as compared with prior art main frames.

With the purpose of further removing the forces from the compression and vibration process from the weld zones, the longitudinal and transverse plates may be joined in a mortise joint so that the transverse plates extend to the edge of the upper and lower bottom plates through the longitudinal plates to form reinforced support for the bottom plates at the external side of the bottom frame member.

Thereby, the compression forces are moved away from the weld zones as the welds are now moved to an area where lesser forces occur. Instead, the forces from the vibrating system are transmitted to the remaining part of the main frame via areas not having any welds and to the base via areas not having any critical welds. The moving of the forces away from the weld zones also has a substantial and positive influence on the service life of the construction, and as mentioned previously, on the possibilities for reducing the number of welds as well as the welding class to be used in the construction for achieving an acceptable service life of it.

Furthermore, it is to be noted that the top frame part of the main frame of concrete molding machine may also be made of two flame cut plates which are arranged in parallel and interconnected by a suitable number of longitudinal and transverse plates.

The invention is explained in more detail below with reference to the accompanying drawings.

DETAILED DESCRIPTION OF THE INVENTION

Figure 1:
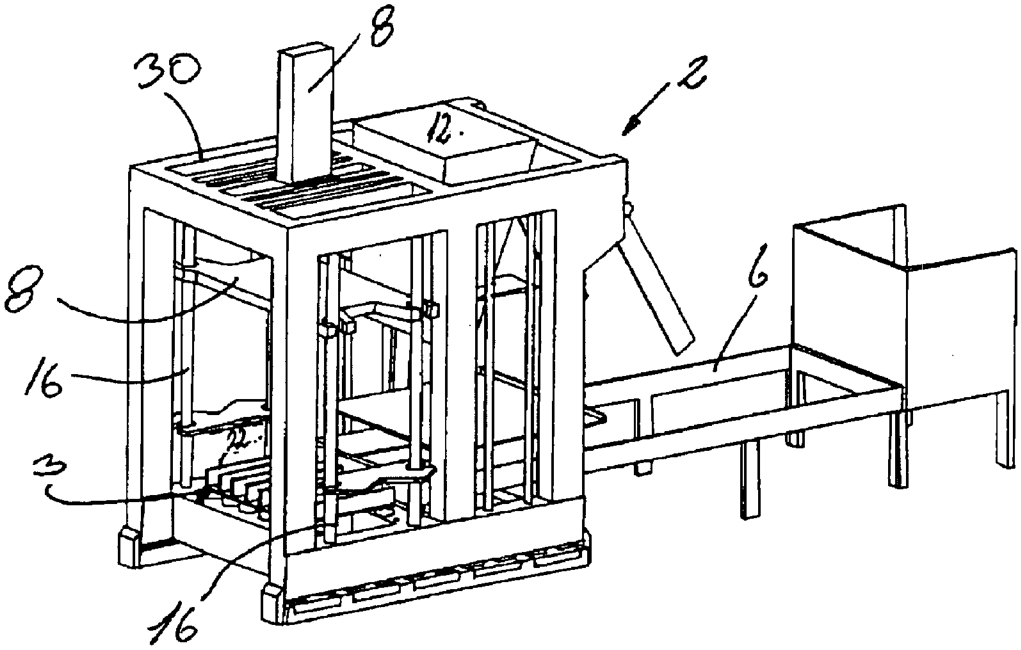
FIG. 1 is a perspective view of a concrete molding machine with a main frame according to the invention.
Figure 2:
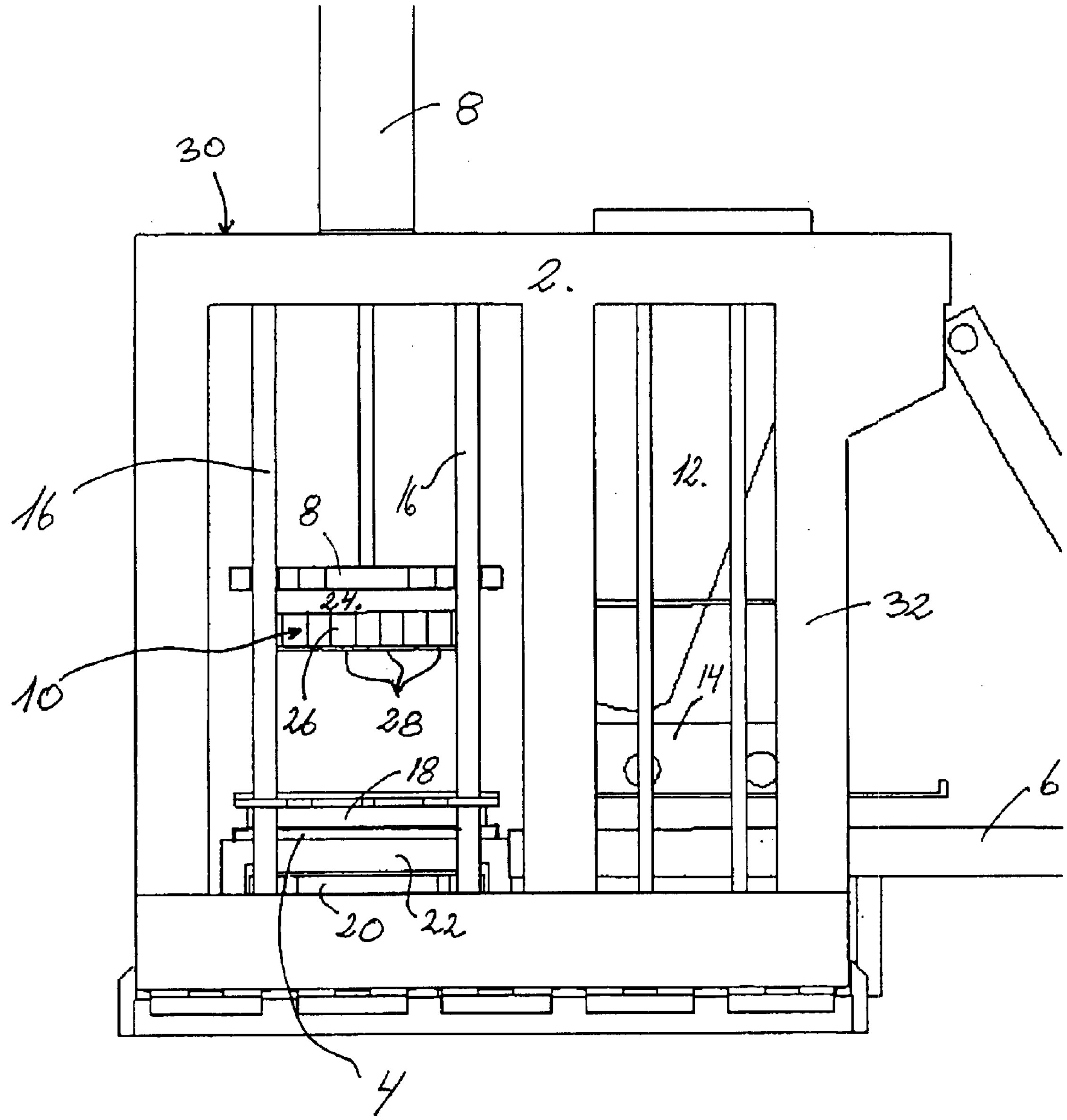
FIG. 2 is a side view of the concrete molding machine shown in FIG. 1.

The main components of the molding apparatus of the are shown in FIGS. 1 and 2. The bottom of a main frame 2' forms a support for a vibration arrangement 3 on which a concrete product slab 4 is carried, and for conveying means 6 for transporting product slabs 4 through the concrete molding machine. Furthermore, the main frame 2' forms a support for a retainer arrangement 8 for the upper mold part 10, a concrete hopper 12 and for a filling arrangement 14 associated with the molding apparatus. The main frame also provides a base for column guides 16 for parallel guiding of mold 18 and the retainer arrangement 8.

The vibration arrangement comprises a vibration table 20 and a grate arrangement 22 and acts on the overlying product slab 4 for compressing the concrete filled into the mold 18.

The mold 18 is constituted by a cellular lower part 18, the cells (not shown) of which are open upward and downward. The cell partitions form the boundaries of and define the desired basic shape of each single slab, and a corresponding upper part 10 has pressing pistons 26 projecting downward from an upper holder plate 24 mounted on the retainer (8), the downward facing sides of the piston 26 having shaped press plates 28 fitting into respective underlying cells in the lower part 18 and which are useful thereby for applying a downward directed retaining force and for ejecting molded items from the cells.

Figure 4:
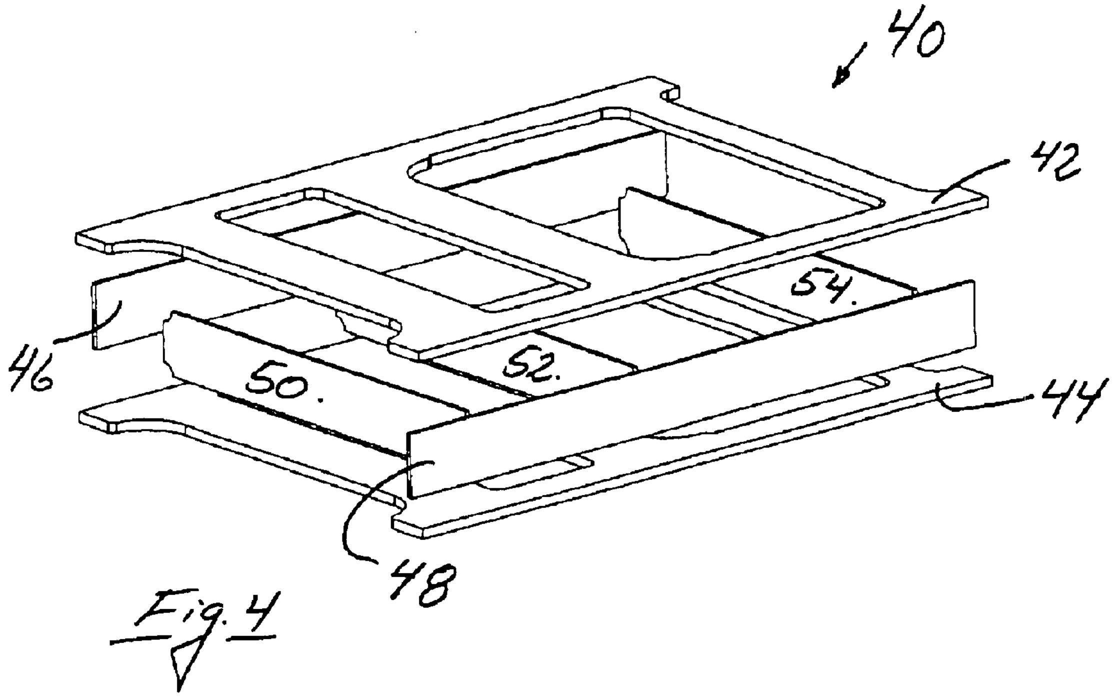
FIG. 4 is an exploded view of the bottom of a main frame according to the invention.
Figure 5:
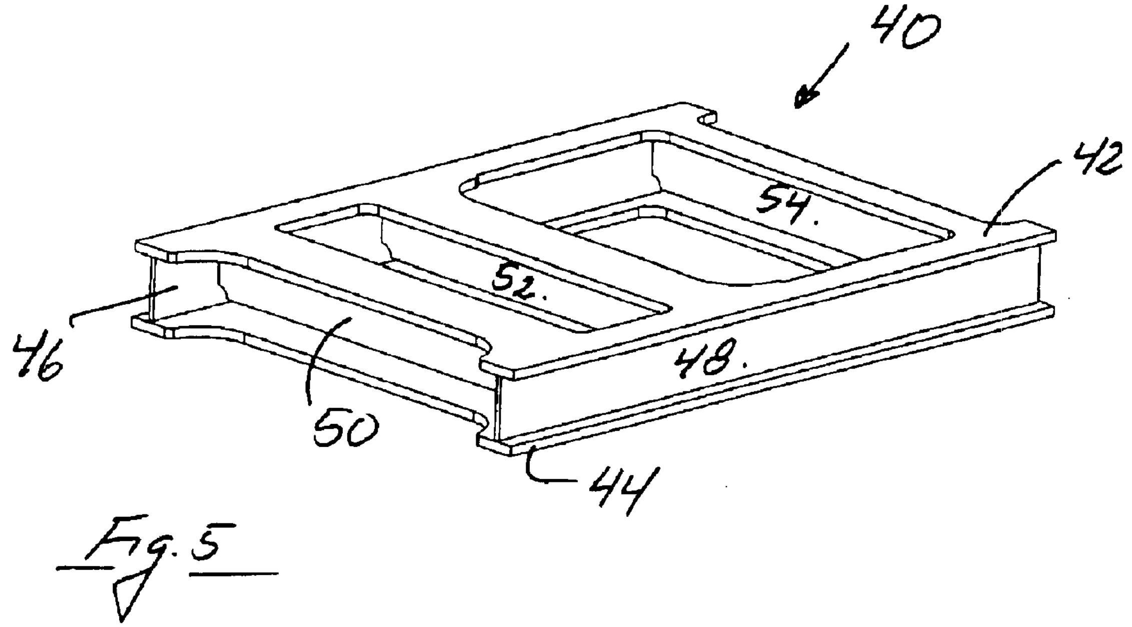
FIG. 5 is the same as FIG. 4 but where the bottom of the main frame is assembled.

FIG. 4 is an exploded view of the bottom 40 of a main frame 2' according to the invention for a concrete molding machine. The bottom 40 is constituted by two flame cut plates 42, 44, two longitudinal plates 46, 48, and three transverse plates 50, 52, 54. In FIG. 5, the bottom 40 of the main frame 2' of FIG. 4 is shown in assembled and welded state.

Figure 6:
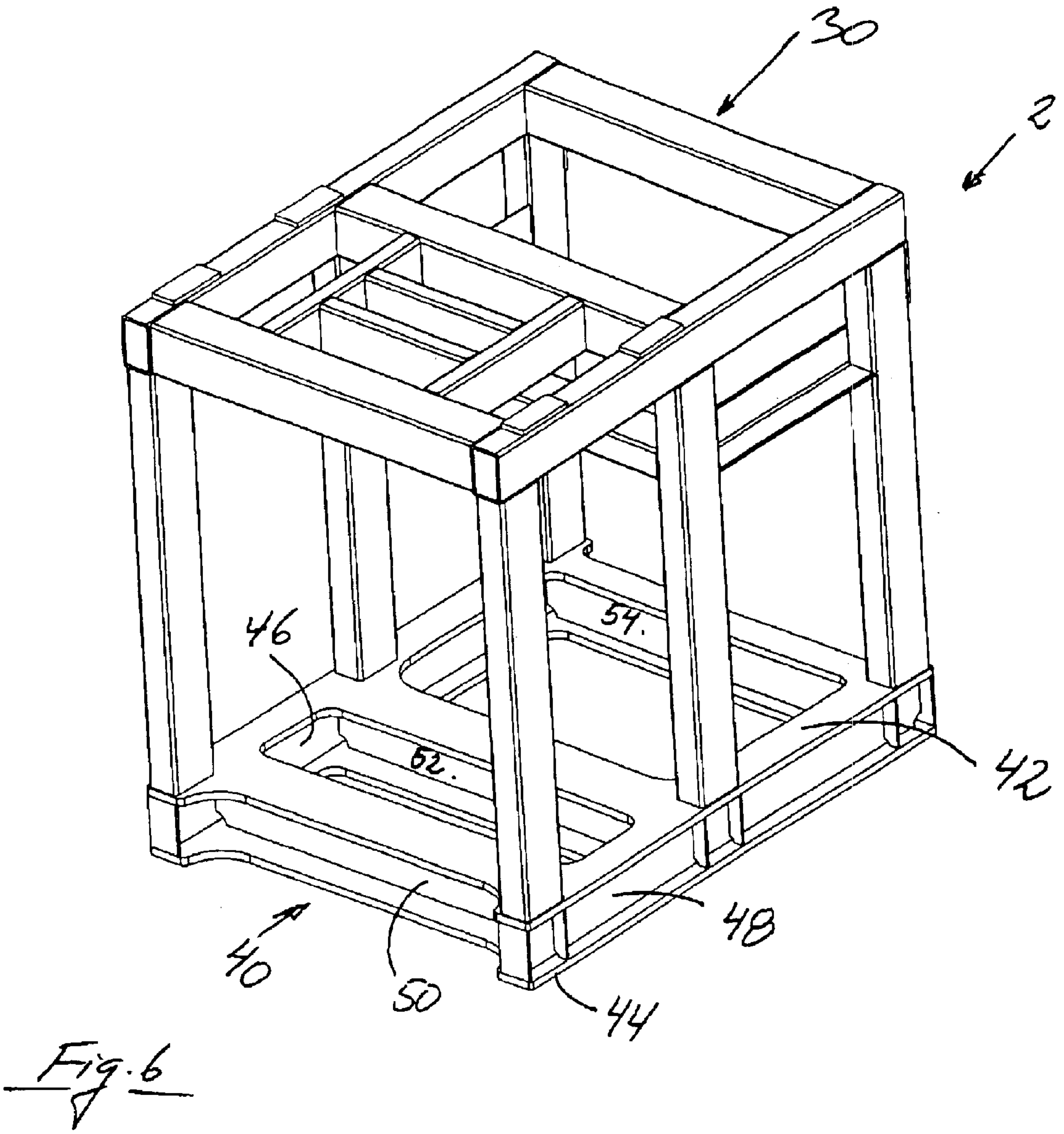
FIG. 6 is a perspective view of a main frame construction with a bottom according to FIG. 4.

In FIG. 6, the entire main frame 2 with bottom 40 according to the present invention is shown in perspective view. It is to be noted that the upper frame 30 may be made according to the same principle as the bottom 40.

Figure 3:
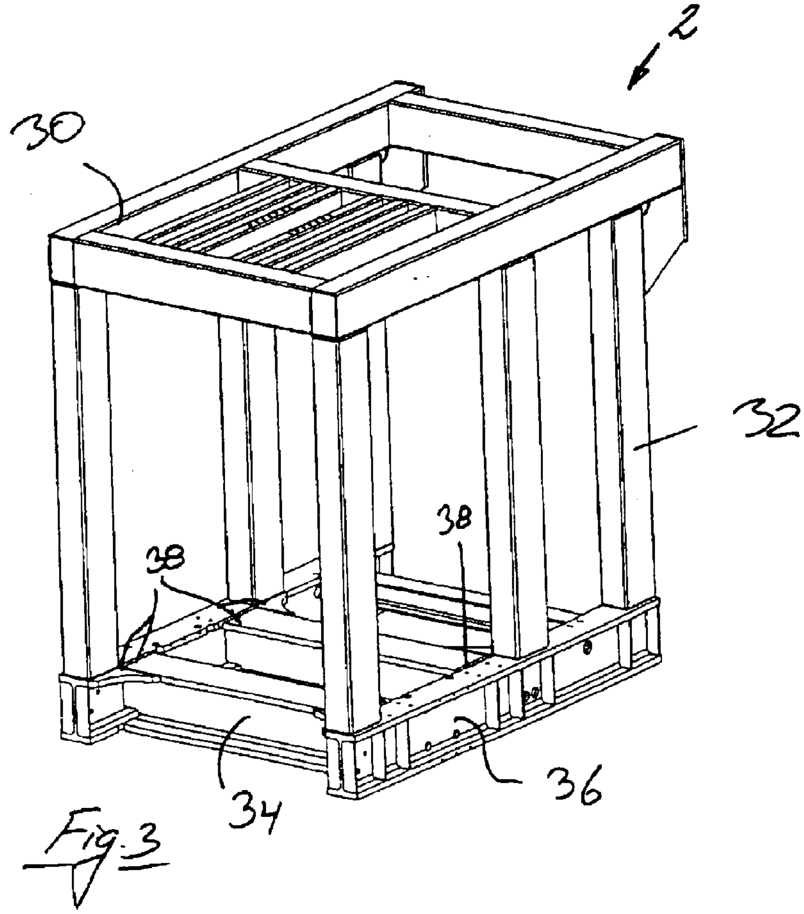
FIG. 3 is a perspective view of a main frame construction for a concrete molding machine according to prior art.

The advantage of this construction of the bottom 40 of the main frame 2' is that the forces transmitted from the vibration arrangement 3 to the bottom 40 are not transferred transversely to the welds, implying that lower classified welds and fewer welds can be used at the joints between the flame cut plates 42, 44 and the longitudinal and transverse plates 50, 52, 54 as compared with the assembly method normally used by making main frames as indicated in FIG. 3, where the said forces between the transverse sections 34 and the longitudinal sections 36 are transmitted via the welds 38.

By the main frame for a concrete molding machine according to the invention, there is indicated a structure which, besides presenting the same or increased service life, is considerably cheaper to produce as compared with the prior art main frames since the welds used in constructing the bottom 40 do not have the same requirements for sharpening the weld surfaces and the welds may also be made of a lower class, facts which imply the possibility of making a concrete molding machine at a more competitive price.

What is claimed is:

1. A main frame for a concrete block molding apparatus which is adapted to support column guides for parallel guiding of a mold and a retainer arrangement, the main frame comprising:

a bottom frame member;

a top frame member; and columns mutually connecting the bottom frame member to the top frame member to form a support of a vibration arrangement for a concrete product, for a retainer arrangement of an upper mold part, for a concrete hopper and for a filling arrangement associated with the molding apparatus;

wherein the bottom frame member is formed of flame cut bottom plates arranged in parallel one above another and forming a basic shape of a bottom of the main frame, the bottom plates being interconnected by at least two uninterrupted longitudinal plates and a plurality of uninterrupted transverse plates extending between and connected to the longitudinal plates; and wherein the transverse plates are extended from one longitudinal plate to the other longitudinal plate.

2. A main frame according to claim 1, wherein the top frame member is formed of flame cut plates which are arranged in parallel one above another and interconnected by the uninterrupted longitudinal and uninterrupted transverse plates.

3. A main frame for a concrete block molding apparatus which is adapted to support column guides for parallel guiding of a mold and a retainer arrangement, the main frame comprising:

a bottom frame member;

a top frame member; and columns mutually connecting the bottom frame member to the top frame member to form a support of a vibration arrangement for a concrete product, for a retainer arrangement of an upper mold part, for a concrete hopper and for a filling arrangement associated with the molding apparatus;

wherein the bottom frame member is formed of flame cut bottom plates arranged in parallel one above another and forming a basic shape of a bottom of the main frame, the bottom plates being interconnected by at least two uninterrupted longitudinal plates and a plurality of uninterrupted transverse plates extending between and connected to the longitudinal plates; and wherein the uninterrupted longitudinal plates and the uninterrupted transverse plates are joined in a mortise joint so that the transverse plates extend to an edge of the bottom plates through the longitudinal plates to form a reinforced support for the bottom plates at an external side of the bottom frame member.

4. A main frame according to claim 1, wherein each of the flame cut bottom plates spans each longitudinal and transverse plate.

5. A concrete block molding apparatus comprising:

a vibration arrangement for a concrete product;

an upper mold part;

a lower mold part;

a retainer arrangement for the upper mold part;

column guides for parallel guiding of the mold parts;

a concrete hopper;

a filling arrangement associated with the mold parts; and a main frame which includes:

a bottom frame member;

a top frame member; and columns mutually connecting the bottom frame member to the top frame member to form a support for the vibration arrangement, for the retainer arrangement, for the concrete hopper and for the filling arrangement, wherein the bottom frame member is formed of flame cut bottom plates arranged in parallel one above another and forming a basic shape of a bottom of the main frame, the bottom plates being interconnected by at least two longitudinal plates and a plurality of transverse plates extending between and connected to the longitudinal plates; and wherein the transverse plates are extended from one longitudinal plate to the other longitudinal plate.

6. A concrete molding apparatus according to claim 5, wherein each of the longitudinal plates and the transverse plates are uninterrupted.

7. A concrete molding apparatus according to claim 5, wherein the top frame member is formed of flame cut plates which are arranged in parallel one above another and interconnected by the longitudinal and transverse plates.

8. A concrete block molding apparatus comprising:

a vibration arrangement for a concrete product;

an upper mold part;

a lower mold part;

a retainer arrangement for the upper mold part;

column guides for parallel guiding of the mold parts;

a concrete hopper;

a filling arrangement associated with the mold parts; and a main frame which includes;

a bottom frame member;

a top frame member; and columns mutually connecting the bottom frame member to the top frame member to form a support for the vibration arrangement, for the retainer arrangement, for the concrete hopper and for the filling arrangement, wherein the bottom frame member is formed of flame cut bottom plates arranged in parallel one above another and forming a basic shape of a bottom of the main frame, the bottom plates being interconnected by at least two longitudinal plates and a plurality of transverse plates extending between and connected to the longitudinal plates; and wherein the longitudinal plates and the transverse plates are joined in a mortise joint so that the transverse plates extend to an edge of the bottom plates through the longitudinal plates to form a reinforced support for the bottom plates at an external side of the bottom frame member.

9. A concrete molding apparatus according to claim 5, wherein each of the flame cut bottom plates spans each longitudinal and transverse plate.

* * * * *